(12) United States Patent
Drexler et al.

(10) Patent No.: US 10,438,513 B2
(45) Date of Patent: Oct. 8, 2019

(54) HARDENED WHITE BOX IMPLEMENTATION 1

(71) Applicant: GIESECKE & DEVRIENT GMBH, München (DE)

(72) Inventors: Hermann Drexler, München (DE); Sven Bauer, Vaterstetten (DE); Jürgen Pulkus, München (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 270 days.

(21) Appl. No.: 15/525,239

(22) PCT Filed: Oct. 30, 2015

(86) PCT No.: PCT/EP2015/002223
§ 371 (c)(1),
(2) Date: May 8, 2017

(87) PCT Pub. No.: WO2016/074776
PCT Pub. Date: May 19, 2016

(65) Prior Publication Data
US 2017/0324543 A1 Nov. 9, 2017

(30) Foreign Application Priority Data
Nov. 10, 2014 (DE) .................. 10 2014 016 548

(51) Int. Cl.
*G09C 1/06* (2006.01)
*G09C 1/00* (2006.01)
(Continued)

(52) U.S. Cl.
CPC ............. *G09C 1/06* (2013.01); *G06F 9/4403* (2013.01); *G06F 21/12* (2013.01); *G09C 1/00* (2013.01);
(Continued)

(58) Field of Classification Search
CPC ........... H04L 2209/16; H04L 2209/127; H04L 9/002; H04L 9/0631; H04L 9/0625; H04L 9/06
See application file for complete search history.

(56) References Cited

U.S. PATENT DOCUMENTS 10,249,220 B2* 4/2019 Drexler .................... G09C 1/00
2004/0139340 A1* 7/2004 Johnson .................. G06F 21/14
713/194
(Continued)

FOREIGN PATENT DOCUMENTS

DE  102014016548 A1  5/2016
WO  2008119901 A2  10/2008
WO  2016074776 A1  5/2016

OTHER PUBLICATIONS

"Minimum Requirements for Evaluating Side-Channel Attack Resistance of RSA, DSA and Diffie-Hellman Key Exchange Implementations Part of AIS 46", Federal Office for Information Security, 2013, pp. 1-91.
(Continued)

*Primary Examiner* — Tae K Kim
(74) *Attorney, Agent, or Firm* — Workman Nydegger

(57) ABSTRACT

The invention provides a processor device having an executable, white-box-masked implementation of a cryptographic algorithm implemented thereon. The white-box masking comprises an affine mapping A, which is so designed that every bit in the output values w of the affine mapping A depends on at least one bit of the obfuscation values y, thereby attaining that the output values w of the affine mapping A are statistically balanced.

19 Claims, 2 Drawing Sheets

(51) Int. Cl.
*H04L 9/00* (2006.01)
*H04L 9/06* (2006.01)
*G06F 9/4401* (2018.01)
*G06F 21/12* (2013.01)
*H04L 9/08* (2006.01)

(52) U.S. Cl.
CPC ............ *H04L 9/002* (2013.01); *H04L 9/0618* (2013.01); *H04L 9/0625* (2013.01); *H04L 9/0631* (2013.01); *H04L 9/0822* (2013.01); *H04L 2209/043* (2013.01); *H04L 2209/08* (2013.01); *H04L 2209/16* (2013.01)

(56) References Cited

U.S. PATENT DOCUMENTS

| | | | | |
|---|---|---|---|---|
| 2009/0158051 | A1* | 6/2009 | Michiels | H04L 9/002 713/189 |
| 2009/0254759 | A1* | 10/2009 | Michiels | H04L 9/002 713/189 |
| 2012/0002807 | A1* | 1/2012 | Michiels | H04L 9/002 380/28 |
| 2012/0093313 | A1* | 4/2012 | Michiels | H04L 9/002 380/255 |
| 2012/0170739 | A1* | 7/2012 | Karroumi | H04L 9/0631 380/28 |
| 2013/0016836 | A1 | 1/2013 | Farrugia et al. | |
| 2013/0259226 | A1* | 10/2013 | Ciet | G06F 21/14 380/44 |
| 2015/0163054 | A1* | 6/2015 | Roelse | H04L 9/06 380/278 |
| 2015/0270949 | A1* | 9/2015 | Michiels | H04L 9/14 380/28 |
| 2016/0328541 | A1* | 11/2016 | Hoogerbrugge | G06F 21/14 |
| 2018/0309568 | A1* | 10/2018 | Bauer | H04L 9/0625 |

OTHER PUBLICATIONS

Chow et al., "White-Box Cryptography and an AES Implementation", Aug. 16, 2002, pp. 1-18.

Chow et al., "A White-Box DES Implementation for DRM Applications", Oct. 10, 2002, pp. 1-16.

Link et al., "Clarifying Obfuscation: Improving the Security of White-Box Encoding", 2004, 11 Pages.

Herbst et al., "An AES Smart Card Implementation Resistant to Power Analysis Attacks", Springer-Verlag Berlin Heidelberg, 2006, pp. 239-252.

Kocher et al., "Differential Power Analysis", 1999, 10 Pages.

Muir, "A Tutorial on White-box AES", Mathematics in Industry vol. 18, Feb. 22, 2013, pp. 209-229.

Biryukov et al., "A Toolbox for Cryptanalysis: Linear and Athne Equivalence Algorithms", EUROCRYPT 2003, 2003, pp. 33-50.

Joppe et al., "Differential Computation Analysis: Hiding your White-Box Designs is Not Enough", IACR, 2016, 22 Pages.

International Preliminary Report on Patentability From PCT Application No. PCT/EP2015/002223, dated May 16, 2017.

International Search Report From PCT Application No. PCT/EP2015/002223, dated Feb. 8, 2016.

* cited by examiner

HARDENED WHITE BOX IMPLEMENTATION 1

FIELD OF THE INVENTION

The invention relates in general to the technical field of protecting cryptographic algorithms against attacks by means of white-box cryptography. More precisely, the invention relates to a processor device with a white-box implementation of a cryptographic algorithm, in particular of a block cipher, in particular the DES or AES.

BACKGROUND OF THE INVENTION

A processor device as intended by the invention is understood to mean an apparatus or other object having a processor, for example a mobile end device such as a smartphone. Software applications—called apps for short—on mobile end devices, for example smartphones, are increasingly being used to carry out cryptographically secured digital transactions, for example for cashless payments at a NFC terminal or for the purchase of goods or services from an online retailer. Further, software applications for cryptographic services such as speech encryption or data encryption are increasingly being used on mobile end devices such as smartphones. For carrying out the transaction or the service, the software application implemented on the processor of the smartphone interacts with a terminal or server. Cryptographic partial tasks of the software applications such as encryption, decryption, signature formation or signature verification are carried out through implementations of cryptographic algorithms. Security-critical data employed by the cryptographic algorithm, e.g. PINs, passwords, cryptographic keys etc., are securely supplied for the processor device. Traditionally, security-critical data are secured against an attack by unauthorized person through (grey-box) cryptography. For this purpose the data are supplied on a security element of the mobile end device, said security element being stand-alone in terms of hardware technology, for example a SIM card removable from the mobile end device.

An alternative approach, which is applicable in particular also for mobile end devices which have no stand-alone security element, is based on the white-box cryptography. In a white-box implementation of a cryptographic algorithm it is attempted to hide the security-critical data, in particular secret cryptographic keys, in the implementation such that an attacker who has full access to the implementation is unable to extract the security-critical data from the implementation. A white-box implementation of the AES crypto-algorithm (Advanced Encryption Standard) is known, for example, from the publication [1] "A Tutorial on White-box AES" by James A. Muir, Cryptology ePrint Archive, Report 2013/104. Likewise, white-box implementations of cryptographic algorithms or routines are distributed commercially.

An ideal white-box implementation of a crypto-algorithm hides security-critical data like cryptographic keys in such a way that they are not ascertainable by an attack.

In the patent application DE 102014016548.5 of the applicant of the present patent application, a method is described for testing a white-box implementation of a cryptographic algorithm, e.g. AES, said implementation being executable on a processor, with which the inventors have succeeded in ascertaining security-critical data by an attack, which according to the concept of the white-box actually should not be possible. From this point of view, the tested white-box implementations are by definition no longer perfect white box due to its attackability, yet are hereinafter still designated as white-box implementations due to their objective of being perfect.

102014016548.5 more precisely describes a test method for a white-box implementation which generates a plain text from a cipher text by means of a secret key, and is present in the processor in the form of machine commands, wherein the processor comprises at least one register. The method comprises the following steps: (a) feeding one plain text of a plurality of plain texts to the white-box implementation; (b) reading out and storing the contents of the at least one register of the processor stepwise while processing the machine commands of the white-box implementation stepwise, wherein intermediate results can be generated while processing the machine commands of the white-box implementation stepwise; (c) repeating the steps (a) and (b) with a further plain text of the plurality of plain texts N-times; and (d) statistically evaluating the contents of the registers and the plain texts, the intermediate results and/or the cipher texts generated from the plain texts by searching for correlations between the contents of the registers and the plain texts, the intermediate results and/or the cipher texts to establish the secret key.

Surprisingly, the examinations of the inventors have shown that for commercially available implementations of cryptographic algorithms under the name of white-box implementations, the secret key may be derived by means of the method described in 102014016548.5.

In the technical publication [3] "Differential Computation Analysis: Hiding your White-Box Designs is Not Enough", J. W. Bos, Ch. Hubain, W. Michiels, and Ph. Teuwen, eprint.iacr.org/2015/753 by the company NXP, there is disclosed a similar test method like in the above-mentioned patent application 102014016548.5, with which the secret key could likewise be ascertained from a white-box implementation of a crypto-algorithm with statistical methods.

In the patent application 102014016548.5, further a directive for action is supplied for a method for hardening the white-box implementation of a cryptographic algorithm executable on a processor. To achieve the hardening, the white-box implementation is configured such that upon generating the cipher text at least one lookup table comes into use to statically map input values of the lookup table to output values of the lookup table. The method comprises the step that the lookup table is statistically permutated such that the individual bits of the permutated lookup table substantially do not correlate with the bits of the lookup table. In other words: the lookup table T is statistically permutated by means of an inverted mapping f (there designated as permutation P) such that the individual bits of the permutated lookup table $T'(x)=f(T(x))$ do not correlate with the bits $T(x)$ for randomly varying input x. This implementation corresponds to the preamble of claim 1.

The invention is based on the task of stating a processor device having an implementation of a cryptographic algorithm, which is specially hardened building on an implementation as stated in 102014016548.5 or a comparable one, by which in the implementation, output values of computation steps (e.g. S-box operations) are not correlated with output values as they would be expected for unprotected implementations, so that no secret information item of the algorithm can be obtained even by means of statistical methods applied on the side-channel outputs. In particular, special implementation details should be stated by means of which a specially hardened implementation can be attained.

SUMMARY OF THE INVENTION

The task is achieved by a processor device according to claim 1. Embodiments of the invention are stated in the dependent claims.

An executable, white-box-masked implementation of a cryptographic algorithm is implemented on the inventive processor device. The algorithm is configured to generate an output text from an input text while employing a secret key K. The implementation comprises an implemented computation step S contained in the algorithm by which input values x are mapped to output values s=S[x], and which is masked to a masked computation step T' by means of an invertible function f.

The invention is characterized in that the invertible function f comprises an affine mapping A applied to the computation step S, said mapping being configured to generate output values w from A by applying A to output values s of the computation step S and additionally to one or several obfuscation values y which are statistically independent of the output values s of the computation step S, so that it holds that w=A(S[x], y)=A(s, y). The affine mapping A is further configured that each every bit in the output values w of the affine mapping A depends on at least one bit of the obfuscation values y, by which is attained that the output values w of the affine mapping A are statistically balanced.

By constructing the function f while employing an affine mapping A so configured, it is achieved that the individual bits of the masked computation step T' do not correlate substantially with the bits of the unmasked computation step S. In this way no information items about the cryptographic key can be obtained by recording the side-channel outputs of the computation step and applying statistical methods to the side-channel outputs.

The inventive white-box-masked implementation is therefore characterized by the fact that it is configured hardened by a targeted design of the mapping f employed to the white-box masking of the computation step S. The special hardening is attained by the affine mapping A configured as described above.

Hence a processor device is created according to claim 1 with a specially hardened implementation for which the output values of computation steps (intermediate results) are so protected that no secret information item of the algorithm can be obtained even by means of statistical methods.
→Subclaims The affine mapping A comprises electively a linear mapping which is formed by a matrix MA, which is organized in columns and rows, wherein the output values s of the computation step S and the statistically independent obfuscation values y are associated with separate columns in the matrix MA. Such a separate arrangement increases the clarity.

Electively, in each row of such a matrix MA having separate columns for output values s of the computation step S and the statistically independent obfuscation values y there is a non-zero value in at least one of the columns having statistically independent values y. As a result of this, it is ensured that at least one obfuscation value y goes into each row of an output vector w which is generated by the application of the matrix MA on an input vector (s,y). Otherwise it could happen that in one row of the output vector w, the obfuscation values y fall out because all matrix values a belonging to y of the matrix MA are zero in this row.

For carrying out the implementation of the white-box-masked computation step T', electively a look-up table STab[x] representing the computation step S is represented.

In this case the obfuscation values y are supplied separately. Alternatively, a look-up table STab[x,y] representing the computation step S and the obfuscation values y are supplied so that a separate supplying of the obfuscation values is omitted.

Electively the white-box-masked computation step T' is represented by a white-box-masked look-up table T'Tab [x, y] in which values f(s, y) are entered, in particular A(s, y).

Electively the implementation additionally comprises a further invertible function g to be applied to input values x of the computation step S, or to input values x of the computation step S and to obfuscation values y according to $g^{-1}(x)$ or $g^{-1}(x, y)$.

Electively there is provided as an algorithm a block cipher having several rounds, in particular DES or AES, and as a computation step S:

one or several SBox operations or one or several inverse SBox operations, of respectively one round in each case; or a combination T of one or several SBox operations S or one or several inverse SBox operations, of respectively one round, with one or several further operations of the round.

In a processor device having algorithm DES there is/are provided as an input value x electively either one or several expanded right entry bits r'i (r'1|r'2| ... ) of a round, or a linkage (x=r'1 XOR k1|r'2 XOR k2| ... ) of one or several expanded right entry bits r'i of a round with one or several key bits ki. If no key bit is contained in the input value, the key for the DES can be integrated for example into a combined operation into which the S-box operation is also integrated.

For algorithm DES, there is or are provided electively as obfuscation value y one or several left entry bits li of the round.

For the algorithm DES, the obfuscation values y are further electively computed by means of a function V from one or several left entry bits li of the round or/and from one or several expanded right entry bit r'i of the round. In a drawing described in detail further below, FIG. 1 shows a DES representation in which the left entry bits li are employed as obfuscation values. FIG. 3 shows a DES representation, in which the left and expanded right entry bit r'i are employed as obfuscation values.

For algorithm DES with a computation step S, which is implemented as a combined operation T with further operations, electively the further operations comprise one or several the following: permutation P; expansion E; addition of left and right entry bits l, r or left and expanded right entry bits l, r'.

If AES is provided as algorithm, there is provided as an input value x electively an input value or part of an input value of an AddRoundKey operation or a SubBytes operation or an inverse SubBytes operation of an AES round.

For algorithm AES, electively the obfuscation values y are computed respectively by means of a function V.

For algorithm AES, the further operations comprise electively one or several of the following: MixColumn operation or one or several substeps of the MixColumn operation or inverse MixColumn operation or one or several substeps of the inverse MixColumn operation.

Electively the obfuscation values y are computed respectively by means of a function V from bits of the input text.

The algorithm electively has several rounds, wherein the function V is newly chosen for every round.

Electively V is a linear mapping or a hash function.

Electively the obfuscation values y further comprise one or several noise random values y[x], in particular random bits, which are added to at least one or all of the output values s of the computation step S. The noise random values y[x] are at first selected randomly. Subsequently, the noise random values y[x] are so altered that y[x] and s are statistically independent. Strictly speaking y[x] are therefore no longer a fully random values, but random values later adapted. By means of these later adapted random values, additional noise is incorporated into the implementation.

The noise random values y[x] are electively provided as further obfuscation values in addition to the left input values l or/and right input values r of a round of the algorithm (e.g. DES or AES) likewise employed as obfuscation values y.

Electively the computation step S has been implemented as a white-box-masked computation step T' on the processor device by means of an implementation method. Electively the white-box-masked computation step T' has been implemented on the processor device in white-box-masked form in that: (i) the (unmasked) computation step S has been carried out to generate output values s, and (ii) the invertible function f has been applied to the generated output values s of the computation step S, and a thereby achieved result has been implemented on the processor device. In applying the invertible function f, in particular the affine mapping was applied.

If the processor device is put into operation and thereby the cryptographic algorithm is executed, e.g. within a software application, then white-box-masked operations T' (e.g. Ti', cf. in particular embodiment from FIG. 4) are executed. By executing the white-box-masked operations T', the computation steps S (in particular e.g. the DES-specific S-box operations) are executed in hardened white-box masked form. Because the computation steps S (e.g. S-boxes) are implemented not in direct form in the processor device, but merely the computation steps S white-box-masked to T' according to the invention, attacks on the processor device are prevented or at least considerably impeded. The same holds if the computation step S (e.g., S-box) is embedded in a combined computation step T (cf. FIG. 2, 3). Also, the combined computation step T is never directly implemented in the processor device but always in white-box-masked form T'.

BRIEF DESCRIPTION OF THE DRAWINGS

Hereinafter the invention will be explained more closely on the basis of exemplary embodiments and with reference to the drawings, in which are shown.

DETAILED DESCRIPTION OF EMBODIMENT EXAMPLES

Figure 1:
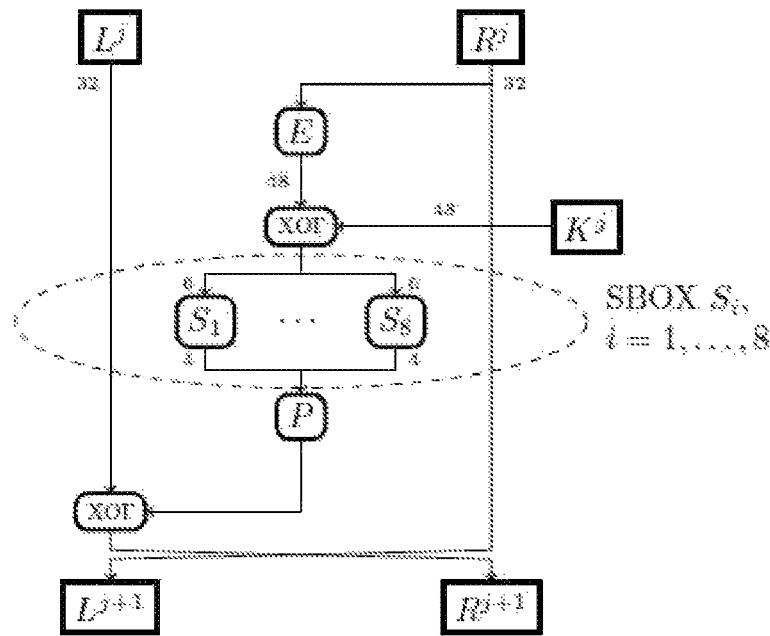
FIG. 1 a DES round in standard representation, according to the prior art, suitably as the basis of the invention.

FIG. 1 shows a DES round according to the prior art. By means of FIG. 1 it is indicated that a computation step S, as is the basis of the invention, can be for example a S-box operation or the totality of eight S-boxes of a DES round. At the entry of a DES round, 64 bit entry data are divided into 32 bit left side L=lj, j=0, . . . , 31 and 32 bit right side R=rj, j=0, . . . 31. The bits of the right side R are expanded by means of an expansion operation to 48 bit expanded entry data E=r'j, j=0, . . . 47 of the right side. The 48 bit expanded entry data E having 48 bit key data K=kj, j=0, . . . 47 are linked by means of an XOR operation to input values xj=rj XOR kj, j=0, . . . 47 for eight S-boxes S. Each of the eight S-boxes S=S1, . . . S8 processes six bits input values xj to each four bits output values sj. The four bit wide output values sj of the eight S-boxes S=S1, . . . S8 are fed to a permutation operation P, and the output values of the permutation P are XORed with bits of the left side and fed to the next DES round. Here the DES round ends with the standard DES implementation.

Figures 3, 4:
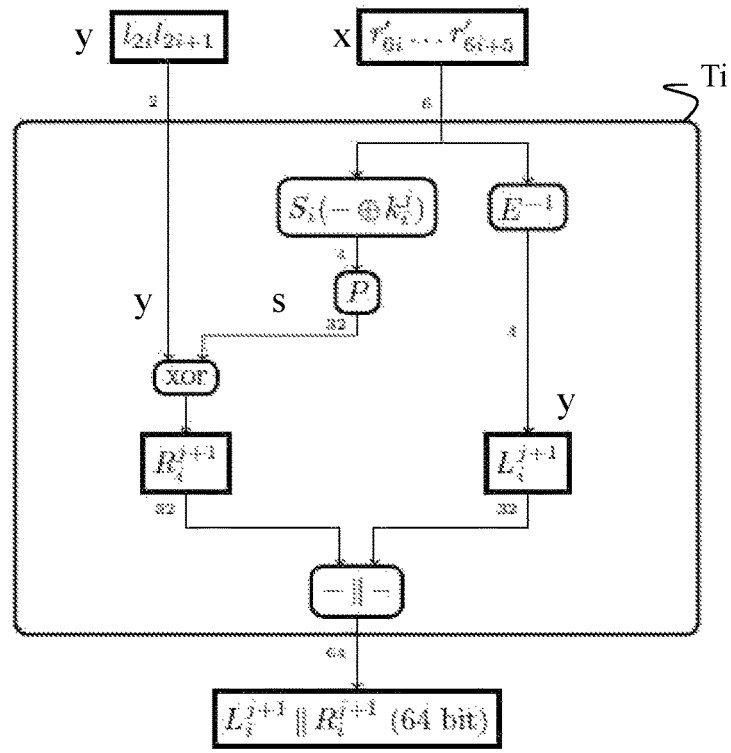
FIG. 3 a detail representation of an individual operation T in the DES round of FIG. 2.
FIG. 4 a white-box masking of a DES round according to FIG. 1, or according to FIG. 2 and FIG. 3, according to embodiments of the invention.

According to the invention, and as represented in FIG. 4, the DES S-box Si (dashed encircled region) is white-box-masked in specially hardened manner. For the white-box masking, the output values sj of the S-boxes are fed to a matrix MA according to the invention by which the linear mapping is represented in the affine mapping A according to w=f(S[x])=A(S[x])=MA(S[x]) (note: in addition to A, f moreover optionally contains invertible images ci, which preferably are applied after A has been applied). Further, in addition to the output values sj of the S-boxes, statistically independent values y are fed to the matrix MA, for example two or more bits lj, j=0, . . . 31 of the left side 64 bit entry data at the entry of the DES round. For the statistically independent values y, there holds a(y)=MA*y+v (v a vector). To attain the special hardening of the white-box masking, the matrix MA is so configured that in addition to the S-Box output values sj, incoming values y are statistically independent of the S-Box output values sj, and that each bit in the output values w of the matrix MA depends on at least one bit from the obfuscation values y.

Hereinafter there is set forth by means of FIG. 2 and FIG. 3 an alternative particularly suitable representation of a DES round for implementing the invention, in which the operations specific to a DES round S-box operation S and permutation P are summarized in a combined operation T. In so doing, the white-box masking will be applied with the mapping A, or concretely with the matrix MA, to the combined operation T, in which the S-Box operation is contained (see FIG. 4).

Figure 2:
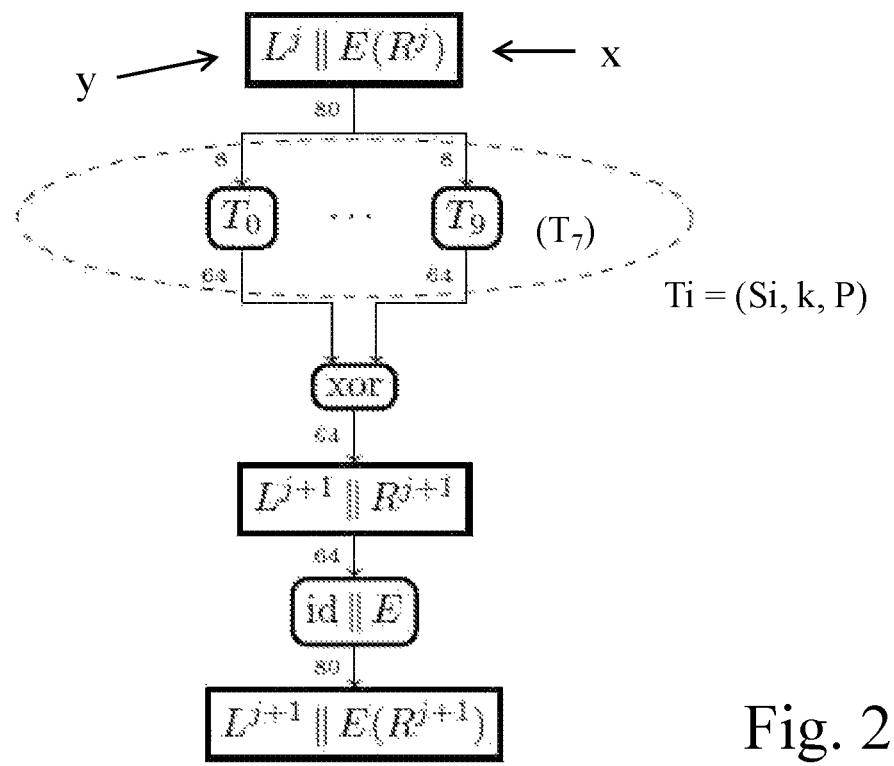
FIG. 2 a DES round in an alternative representation, having S-box operations S embedded in operations T, and specifically suitably as the basis of the invention.

FIG. 2 shows a DES round in an alternative representation, specifically suitably for the application of a white-box masking according to the invention. At the entry of the DES round, first as in FIG. 1, 64 bit entry data are divided into 32 bit left side L=lj, j=0, . . . , 31 and 32 bit right side R=rj, j=0, . . . 31, and the bits of the right side are expanded to 48 bit E(R). For the alternative representation of FIG. 2, two or more bits of the 32 bit L=lj, j=0, . . . , 31 of the left side of the round entry data are employed as obfuscation width y. In this way, upon executing the DES round, the DES-specific eight S-box operations are executed by the fact that a multiplicity of eight or ten combined operations T=T0, . . . T7 or T0, . . . T9 is carried out, in which the S-Box operations S=S1, . . . S8 are comprised.

FIG. 3 shows the detailed structure of an individual combined operation T=Ti, i=0, . . . 7 (or 0, . . . 9 where applicable) of FIG. 2. (Optionally additionally present padding with zero bits and shifts are omitted in FIG. 3 in favor of better clarity.) In the combined operations T=Ti of FIG. 2 and FIG. 3, as opposed to the S-boxes S of the DES representation of FIG. 1, the key kj and the DES-typical permutation P are already taken into account in the operation T. The S-box with the key kj taken into account is represented in FIG. 3 by the operation box Si (-XORkij), the permutation by P. Further, before the computation step S, thus before the S-box operations S1, . . . S8, eight (or ten)

overall tables T0, ... T7 (or T0, ... T9) are generated, in which respectively six bit entry values xj=rj, j=0, ... 47 (now not XORed with k, because the key bits kj are already contained in S) for eight S-boxes S and two bit obfuscation values lj, j=0, ..., 31 are contained and for ten overall tables Ti further bits obfuscation values lj, j=0, ..., 31 are contained. Here, the two (or more) bit obfuscation values lj are not processed by the boxes. The each six bit entry values xj=rj XOR kj are each processed by an S-box. Therefore the overall tables Ti deliver output values which contain exit values sj of the S-boxes as well as obfuscation values lj.

As represented in FIG. 4, the white-box masking of the implementation is carried out by feeding the output values of the combined operations (overall tables) Ti to the matrix MA according to the invention by which the affine mapping A according to the invention is represented. Here, the exit values S(x) of the computation step S, bits of the entry value x thus bits rj of the right side, as well as the statistically independent values y, i.e. the bits employed as obfuscation values lj of the left side of the DES round entry value, are fed to the matrix MA. A separate fetching of the statistically independent values y=lj is not required here, because they are already contained in the combined operation T. For this reason the DES representation of FIG. 2 is particularly well suitable for implementing the invention. The result of the masking are white-box-masked operations Ti', i=0, ... 9 or i=0, ... 7. These white-box-masked operations Ti' are implemented into the processor device.

In the embodiment of FIG. 4, the affine mapping A contained in the mapping f employed in the white-box masking is configured as a matrix MA, having coefficients aij, i=0, ... l−1, j=0, ... n+m−1.

The matrix MA is multiplied by the entry vector (s,y), which comprises S-box exit values s=S[x] (e.g. bits r of the right side) and obfuscation values y (e.g. bits of the left side), to generate an exit vector w. The sum formula in FIG. 4 illustrates this aspect for an individual row i having the coefficients aij (j=0, n+m−1) of the matrix MA, and an individual record σi generated thereby of the exit vector w. In the entry vector (s,y), the S-box exit values s are contained in the upper n records and the obfuscation values y in the lower m records. The matrix MA correspondingly contains on the left the n coefficients aij, j=0, ... n−1 of MA to be multiplied with the S-box exit values s=s0, sn−1. On the right in the matrix MA are the m coefficients aij, j=n, ... n+m−1 of MA to be multiplied with the obfuscation values y=y0, ... ym−1.

The matrix MA is so constructed according to the invention that the effect is achieved that the right sum of the sum equation for σi (note: σi designates individual bits of w $$\sum_{j=0}^{m-1} a_{i,n+j} y_j$$

disappears for no row index i, i=0, ... l−1. This effect is attained by the fact that in every row i, at least one of the coefficients ai, n+j, j=0, ... m−1, which are to be multiplied with the obfuscation values y=yj, j=0, ... m−1, is non-zero. Through the effect it is ensured that in no row i, i=0, ... l−1 the obfuscation values y in the output vector w disappear, thus in every row i in the record wi of the output vector w at least one obfuscation value yj is contained. This in turn has the further-reaching effect that the output values w of the affine mapping A are statistically balanced.

Glossary

General:
S: computation step, in particular DES SBOX or eight DES S-boxes, in particular for standard representation of DES
T: operation comprising computation step S, for alternative DES representation
T': white-box-obfuscated computation step S, having S embedded in T where applicable
x: input value in computation step S (or T)
y: obfuscation value
r': expanded right side of the input of a round
k: key
s: output value of S (e.g. S-box)
w: output value of T'(masked S)
If S=DES S-box or eight DES S-boxes:
x=r' XOR k for standard representation of DES
x=r' for alternative representation of DES
l=bits from left side of the bits at the DES round-entry (32 bit)
r=bits from right side of the bits at the DES round-entry (32 bit)
r'=bits from expanded right side r at the DES round-entry (48 bit)

CITED PRIOR ART

[1] "A Tutorial on White-box AES", James A. Muir, Cryptology ePrint Archive, Report 2013/104, eprint.iacr.org/2013/104
[2] DE 102014016548.5 (submitted on 10 Nov. 2014)
[3] "Differential Computation Analysis: Hiding your White-Box Designs is Not Enough", J. W. Bos, Ch. Hubain, W. Michiels, and Ph. Teuwen, eprint.iacr.org/2015/753, retrieved on 31 Jul. 2015

The invention claimed is:
1. A processor device comprising:
one or more processors,
wherein the one or more processors has an executable white-box-masked implementation of a cryptographic algorithm implemented thereon, which is configured to generate an output text, from an input text while employing a secret key K, wherein the implementation comprises an implemented computation step S by which input values x are mapped to output values s=S[x], and which is masked to a white-box-masked computation step T' by means of an invertible function f;
wherein the invertible function f comprises an affine mapping A applied to the computation step S, said mapping being configured to generate output values w from A by applying A to output values s of the computation step S and additionally to one or several obfuscation values y which are statistically independent of the output values s of the computation step S, so that it holds that w=A(S[x], y)=A(s, y); and
wherein the affine mapping A is further so designed that every bit in the output values w of the affine mapping A depends on at least one bit of the obfuscation values y, thereby attaining that the output values w of the affine mapping A are statistically balanced.
2. The processor device according to claim 1, wherein the affine mapping A comprises a linear mapping which is formed by a matrix MA, which is organized in columns and rows, wherein the output values s of the computation step S and the statistically independent obfuscation values y are associated with separate columns in the matrix MA.

3. The processor device according to claim 2, wherein in each row of the matrix MA in at least one of the columns having statistically independent values y there is contained a non-zero value.

4. The processor device according to claim 1, wherein for carrying out the implementation of the white-box-masked computation step T' there has been supplied a look-up table STab[x] representing the computation step S, or a look-up table STab[x,y] representing the computation step S and the obfuscation values y.

5. The processor device according to claim 1, wherein the white-box-masked computation step T' is represented by a white-box-masked look-up table T'Tab [x, y] in which values f(s, y) are entered.

6. The processor device according to claim 1, wherein the implementation additionally comprises a further invertible function g to be applied to input values x of the computation step S, or to input values x of the computation step S and to obfuscation values y according to $g^{-1}(x)$ or $g^{-1}(x, y)$.

7. The processor device according to claim 1, wherein there is provided as an algorithm a block cipher having several rounds, and as a computation step S:
one or several SBox operations or one or several inverse SBox operations, of one round in each case; or
a combination of one or several SBox operations or one or several inverse SBox operations, of respectively one round, with one or several further operations of the round.

8. The processor device according to claim 7 having algorithm DES, wherein there is/are provided as an input value x either one or several expanded right entry bits r'i ( r'1 |r'2|. . . ) of a round, or a linkage (x=r'1 XOR k1|r'2 XOR k2 |. . . ) of one or several expanded right entry bits r'i of a round with one or several key bits ki; or/and
one or several left entry bits li of the round go into the obfuscation values y.

9. The processor device according to claim 7 having algorithm DES, wherein the obfuscation values y are computed by means of a function V from one or several left entry bits li of the round or/and from one or several expanded right entry bits r'i of the round, wherein V is electively a linear mapping or a hash function.

10. The processor device according to claim 9, wherein the algorithm has several rounds and the function V is newly chosen for every round.

11. The processor device according to claim 7, having algorithm DES, wherein the further operations comprise one or several of the following: permutation P; expansion E; addition of left and right entry bits 1, r or left and expanded right entry bits 1, r'.

12. The processor device according to claim 7 having algorithm AES, wherein there is provided as an input value x an input value or part of an input value of an AddRound-Key operation or a SubBytes operation or an inverse Sub-Bytes operation of an AES round.

13. The processor device according to claim 7 having algorithm AES, wherein the further operations comprise one or several of the following: MixColumn operation or one or several substeps of the MixColumn operation or inverse MixColumn operation or one or several substeps of the inverse MixColumn operation.

14. The processor device according to claim 1, wherein the obfuscation values y are computed respectively by means of a function V from bits of the input text, wherein V is electively a linear mapping or a hash function.

15. The processor device according to claim 14, wherein the algorithm has several rounds and the function V is newly chosen for every round.

16. The processor device according to claim 1, wherein the obfuscation values y further comprise one or several random values y[x], which are added to at least one or all of the output values s of the computation step S, wherein the random values y[x] are first selected randomly and thereupon altered in such a way that y[x] and s are statistically independent.

17. The processor device according to claim 1, wherein the computation step S has been implemented on the processor device as a white-box-masked computation step T' in that: (i) the computation step S has been carried out to generate output values s, and (ii) the invertible function f has been applied to the generated output values s of the computation step S and the obfuscation values y, and a thereby achieved result T' has been implemented on the processor device.

18. A method of executing a white-box-masked implementation of a cryptographic algorithm implemented on a processor device, which is configured to generate an output text, from an input text while employing a secret key K, the method comprising:
implementing a computation step S by which input values x are mapped to output values s=S[x], and which is masked to a white-box-masked computation step T' by an invertible function f,
wherein the invertible function f includes an affine mapping A applied to the computation step S, said mapping being configured to generate output values w from A by applying A to output values s of the computation step S and additionally to one or several obfuscation values y which are statistically independent of the output values s of the computation step S, so that it holds that w=A(S[x], y)=A(s, y); and
wherein the affine mapping A is further so designed that every bit in the output values w of the affine mapping A depends on at least one bit of the obfuscation values y such that the output values w of the affine mapping A are statistically balanced.

19. One or more non-transitory computer-readable mediums having stored thereon executable instructions that when executed by the one or more processors of a processor device configure the processor device to perform a method of executing a white-box-masked implementation of a cryptographic algorithm implemented on the processor device, which is configured to generate an output text, from an input text while employing a secret key K, comprising:
implementing a computation step S by which input values x are mapped to output values s=S[x], and which is masked to a white-box-masked computation step T' by an invertible function f,
wherein the invertible function f includes an affine mapping A applied to the computation step S, said mapping being configured to generate output values w from A by applying A to output values s of the computation step S and additionally to one or several obfuscation values y which are statistically independent of the output values s of the computation step S, so that it holds that w=A(S[x], y)=A(s, y); and
wherein the affine mapping A is further so designed that every bit in the output values w of the affine mapping A depends on at least one bit of the obfuscation values y such that the output values w of the affine mapping A are statistically balanced.

* * * * *